United States Patent
Baba et al.

[15] 3,691,364
[45] Sept. 12, 1972

[54] CONTINUOUS ANALYZING DEVICE

[72] Inventors: Tatsuo Baba; Katsuo Abe, both of Tokyo, Japan

[73] Assignee: Ohkura Electric Co., Ltd., Tokyo, Japan

[22] Filed: March 16, 1970

[21] Appl. No.: 19,779

[30] Foreign Application Priority Data

Mar. 20, 1969 Japan..................44/21506

[52] U.S. Cl. ..............235/181, 73/23.1, 235/151.35
[51] Int. Cl. .............................................G06f 15/34
[58] Field of Search.......235/151.13, 151.35, 150.31, 235/181; 73/23.1, 421.5 R; 55/67, 386

[56] References Cited

UNITED STATES PATENTS

| | | | |
|---|---|---|---|
| 3,535,084 | 10/1970 | Izawa et al. | 73/23.1 X |
| 3,395,340 | 7/1968 | Anstey et al. | 235/181 X |
| 3,498,106 | 3/1970 | Fuller et al. | 73/23.1 |
| 3,270,315 | 8/1966 | Parks | 235/181 X |
| 3,422,603 | 1/1969 | Redmond, Jr. | 55/386 |
| 3,507,147 | 4/1970 | Llewellyn | 73/421.5 X |
| 3,550,429 | 12/1970 | MacMurtrie et al. | 73/23.1 |
| 3,553,723 | 1/1971 | Ohnsorg | 235/181 |

*Primary Examiner*—Malcolm A. Morrison
*Assistant Examiner*—Jerry Smith
*Attorney*—Wenderoth, Lind & Ponack

[57] ABSTRACT

Continuous analysis is performed by continuously injecting a plurality of samples according to a pulsed pseudo-random binary signal, and by computing a cross-correlation function of the pseudo-random binary signal or its linear function and a detector output whereby to detect, the cross-correlation as the response corresponding to the result of measurement.

3 Claims, 13 Drawing Figures

PATENTED SEP 12 1972 3,691,364

TATSUO BABA, and INVENTORS
KATSUO ABE,

BY Wenderoth, Lind & Ponack
Attorneys

FIG.4
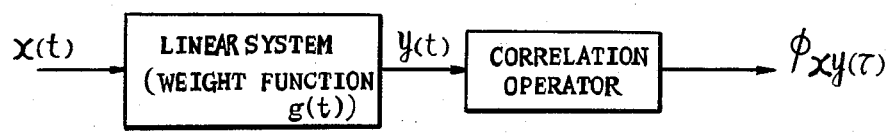
FIG.5a
FIG.5b
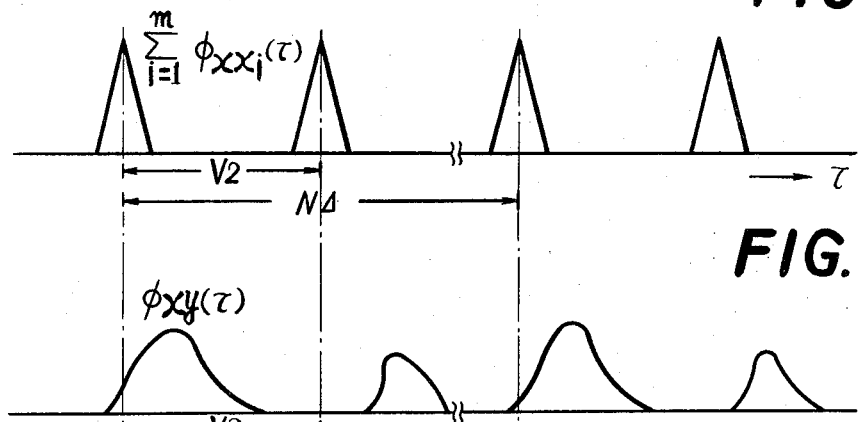
FIG.6
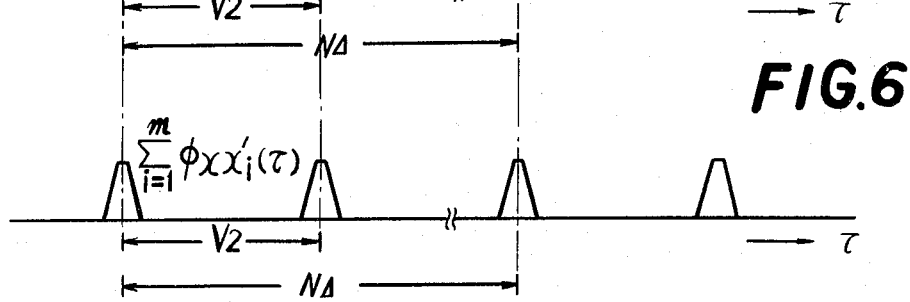

TATSUO BABA and
KATSUO ABE,

INVENTORS

BY Wendroth, Lind & Ponack
Attorneys

CONTINUOUS ANALYZING DEVICE

BACKGROUND OF THE INVENTION

This invention relates to improvements of a continuous analyzing device.

Most prior art analyzing devices are of the so-called batch type wherein samples are instantenously injected as a pulse as shown in FIG. 1a and, the result is determined as shown in FIG. 1b so as to repeat this cycle of operation with a constant period of analysis T so that it was not possible to continuously obtain the result of analysis.

The so-called correlation system has also been proposed utilizing pseudo-random binary signals in order to operate the analyzing device to analyze continuously the result of measurement of multiple samples. According to this system, however, as it is necessary to inject a predetermined quantity of sample according to the sequence of a pseudo-random binary signal $x(t)$ which is in the form of a pulse and has a periodic auto-correlation function as shown in FIG. 2 and requires an expensive and complicated sample injection device of high engineering level.

SUMMARY OF THE INVENTION

It is an object of this invention to improve the reliability and accuracy of the analysis and to simplify the construction of the analyzing device by injecting the sample according to a pulsed pseudo-random binary signal $x'(t)$ as shown in FIG. 3a rather than said pseudo-random binary signal.

From the standpoint of control engineering the analyzing operation of the prior art analyzing device of the batch method can be deemed as the measurement of the pulse response of a linear system.

More particularly, with reference to FIG. 1, assume now that $m(t)$ represents the sample (or input signal), $c(t)$ the output of a detector (output signal), and $g_m(t)$ the weighting function of a linear system including a sample, an analyzer portion and a detector, we obtain the following equation:

$$c(t) = \int_0^\infty g_m(\alpha) m(t-\alpha) d\alpha \quad (1)$$

With reference to FIG. 4, in a linear system, if it is assumed that $x(t)$ represents an input, $y(t)$ an output, and $g(t)$ the weighting function of the system, $$y(t) = \int_0^\infty g(\alpha) \chi(t-\alpha) d\alpha \quad (2)$$

$$\phi xy(\tau) = \int_0^\infty g(\alpha) \phi xx(\tau-\alpha) d\alpha \quad (3)$$

where $\phi xx(\tau)$ represents an auto-correlation function and $\phi xy(\tau)$ a cross-correlation function.

Since equations 2 and 3 are similar, if $x(t)$ represents a pseudo-random binary signal of a period $N\Delta$, its auto-correlation function and cross-correlation function will be defined by the following equations.

$$\phi_{xx}(\tau) = \frac{1}{N\Delta} \int_{t-N\Delta}^{t} x(l) x(l-\tau) dl \quad (4)$$

$$\phi_{x\gamma}(\tau) = \frac{1}{N\Delta} \int_{t-N\Delta}^{t} \gamma(l)(l-\tau) dl \quad (5)$$

wherein $l$ denotes the integral variable between time $t-N\Delta$ and time $t$.

However, as shown in FIG. 2b, since the pseudo-random binary signal takes the form of a pulse shaped, periodic auto-correlation function it is possible to measure its pulse response by determining the cross-correlation function $\phi xy(\tau)$ with suitable selection of its period.

Accordingly, when the sample is introduced into the analyzing device according to the pseudo-random binary signal and when the period of the signal is selected to be equal to or larger than the period of analysis T of the prior apparatus, although the detector output is not used directly as the result of analysis where a correlator is provided to compute the cross-correlation function between the detector output and the pseudo-random binary signal or its linear function, it will become possible to continuously obtain the result of analysis.

Further, in accordance with this system, since signals of the linear function, for example, pseudo-binary signals of different phases are independent from each other it is possible to make simultaneous analysis of a plurality of samples of multiple components by means of the same device.

Let the number of the samples be denoted by $m$ and the periods of analysis thereof by the prior batch method by $T_1, T_2, \ldots T_i \ldots T_m$, respectively, and when the following conditions are satisfied where signals utilized to inject the sample are expressed by $x_1 = x(t-v_1)$, $x_2 = x(t-v_2) \ldots x_i = x(t-v_i) \ldots$ and $x_m = x(t-v_m)$, $$\begin{cases} \text{when } m=1 \text{ and} \\ v_1 = 0 \\ T_m \leq N\Delta \end{cases} \quad \begin{cases} \text{when } m \geq 2 \\ v_1 = 0 \\ v_i \geq \sum_{j=1}^{i-1} T_j, \; i=2, 3 \ldots m \\ Vm + Tm \leq N\Delta \end{cases}$$

then, as shown in FIG. 5, these conditions correspond to a case where the respective samples are injected in the form of a pulse $\Sigma \phi xxi$, shown in FIG. 5a and the result of the $i$th sample will be given by $\phi xy(\sigma+v_i)$ so that following equations hold:

$$y(t) = \int_0^\infty \sum_{i=1}^{m} g_i(\alpha) \chi(t-\alpha) d\alpha \quad (6)$$

$$\phi xy(\tau) = \int_0^\infty \sum_{i=1}^{m} g_i(\alpha) \phi xx(\tau-\alpha) d\alpha \quad (7)$$

Thus, it becomes possible to perform simultaneous and continuous analysis of a number of samples of multiple components, as shown in FIG. 5b.

Even with this system, however, as it is necessary to inject the sample accurately, not only qualitatively, but also in the form of a wave, according to the sequence of the pseudo-random binary signal, and in order to realize high accuracies during analysis it has required complicated injection devices of high engineering levels.

Accordingly a more specific object of this invention is to provide an improved analyzing device of higher reliability and accuracy with a simplified construction which utilizes the above described feature of the multiple continuous analysis of the correlation method utilizing the pseudo-random binary signal, but injection of the sample is effected according to the sequence of a pulsed pseudo-random binary signal.

BRIEF DESCRIPTION OF THE DRAWING

The invention can be more fully understood from the following detailed description taken in conjunction with the accompanying drawing in which:

FIG. 2b shows the auto-correlation function of the signal shown in FIG. 2a;

FIG. 4 is a block diagram to explain a method of measurement by the correlation method, pulse response of a general linear system;

FIG. 5a shows the cross-correlation function of pseudo-random binary signals $x_i(t)$ and $x(t)$ utilized to inject the sample when analyzing a number of samples;

FIG. 5b shows the correlation function of the detector outputs $y(t)$ and $x(t)$;

FIG. 6 shows the cross-correlation function of pulsed pseudo-random binary signals $x'_i(t)$ and $x(t)$;

DESCRIPTION OF THE PREFERRED EMBODIMENTS

A pulsed pseudo-random binary signal $x'(t)$ is defined as the signal which can be expressed in terms of a product of a pulse signal $p(t)$ having a repetition period $\Delta$ and a pulse width $\delta$ and a pseudo-random binary signal $x(t)$, thus the pulsed pseudo-random binary signal $x'(t)$ is expressed in the form of a conjunction of said pulse signal $p(t)$ and the pseudo-random binary signal $x(t)$, as shown in the following equation:

$$x'(t) = p(t) \cdot x(t) \quad \delta < \Delta \quad (8)$$

Figure 1A:
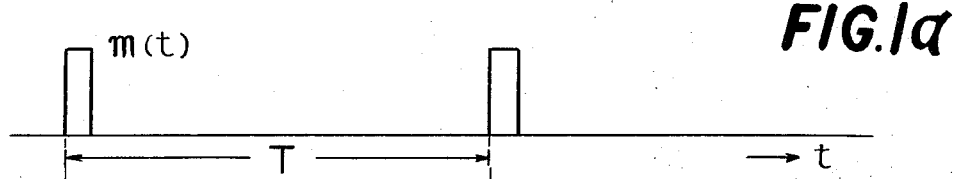
FIGS. 1a and 1b are plots to illustrate one example of a sequence of sample injection and the output of a detector of a prior art analyzing device.
Figure 1B:
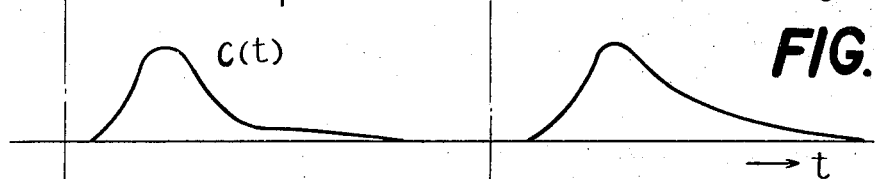
Figure 2A:
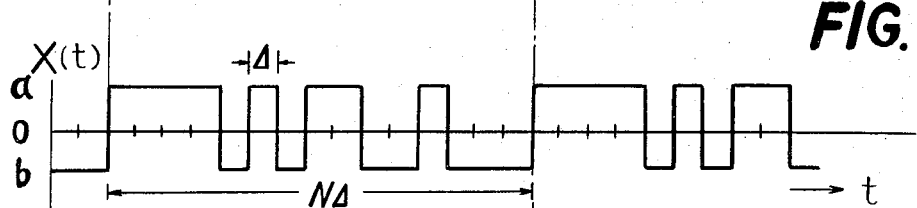
FIG. 2a is a curve representing a pseudo-random binary signal $x(t)$, wherein $N$ equals 15 and $\Delta$ represents the minimum pulse width.
Figure 2B:
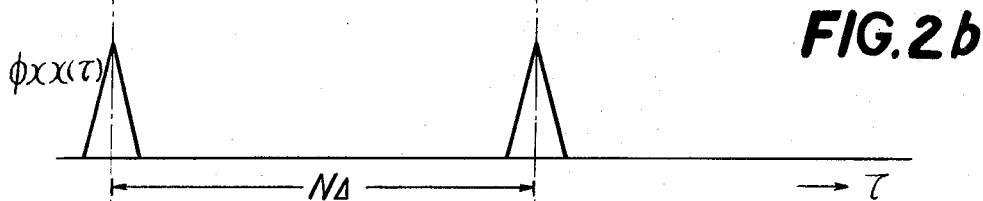
Figure 3A:
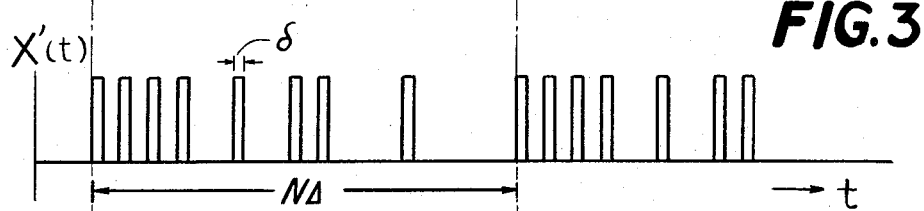
FIG. 3a shows one example of a pulsed pseudo-random binary signal $x'(t)$ utilized to inject the sample.

This pulsed signal can be shown by FIG. 3a.

Figure 3B:
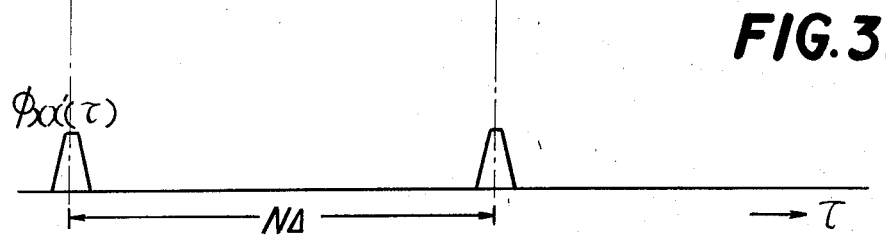
FIG. 3b shows the cross-correlation function of both signals $x(t)$ and $x'(t)$.

The cross-correlation function $\phi xx'(\tau)$ of signals $x(t)$ and $x'(t)$ is expressed by $$\phi xx'(\tau) = \frac{1}{N\Delta} \int_{t-N\Delta}^{t} x'(l) x(l-\tau) dl \quad (9)$$

and it takes a pulsed periodic correlation function as shown in FIG. 3b. In the analysis of a plurality of samples when the $i$th sample is injected at $x'_i$, then $$x'_i(t) = p(t) x_i(t) = p(t) x(t - v_i) \quad (10)$$

In this case $\Sigma \phi xx'(\tau)$ is shown by FIG. 6 so that it is possible to continuously analyze a plurality of samples even when the sample is injected according to the pulsed pseudo-random binary signal $x'_i(t)$ rather than the pseudo-random binary signal $x_i(t)$.

Further, when the sample is injected according to the sequence of this pulsed pseudo-random binary signal so long as the quantity of injection is maintained constant at a given time and the pulse $p(t)$ is reproducible, the waveform may be of any form so that it is possible to utilize the sample injection means of the prior analyzing device.

Even when the pulse $p(t)$ is shifted by $k\delta$, thus $$\left.\begin{array}{l} p'(t) = p(t - k\delta) \\ k = 1, 2, \ldots \\ k\delta < \Delta \end{array}\right\} \quad (11)$$

$$x''(t) = p'(t)x(t) = p(t - k\delta)x(t) \quad (12)$$

and the result will be that $\phi xx''(\tau)$ is equal to $\phi xx'$ shifted by $k\delta$. As a result, where a plurality of samples are to be analyzed by employing a plurality of pulses $p(t - \delta)$, $p(t - 2\delta)$ . . . instead of a common pulse $p(t)$ it is possible to avoid simultaneous injection of a plurality of samples, thus eliminating the effect thereof upon the accuracy of the analysis.

Figure 7:
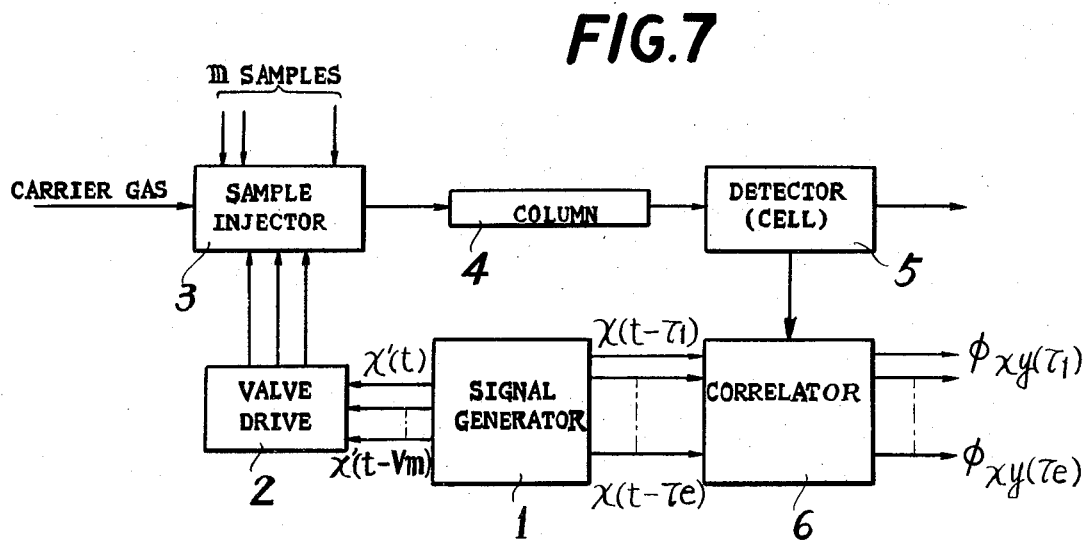
FIG. 7 shows a block diagram of this invention as applied to a gas chromatograph and FIGS. 8a and 8b are partial block diagrams of different arrangements of sample injection means.

An application of this invention to a gas chromatograph will now be described with reference to FIG. 7. In FIG. 7, a signal generator 1 is provided to generate a pseudo-random binary signal required for correlation and a pulsed pseudo-random binary signal required for sample injection. A valve driver 2 is arranged to drive sampling valves of a sample injector 3 in accordance with the sequence of the pulsed pseudo-random binary signal.

The sample injector 3 comprises a plurality of sampling valves and conduits connected thereto which are of the same type as those utilized in the prior art gas chromatograph so as to inject respective samples in a carrier gas adjusted at a constant flow. Also a column 4 and a detector may be the same as those of the prior art gas chromatograph but since samples are injected continuously, the output $y(t)$ from the detector 5 does not form a chromatogram. But by computing the cross-correlation function $\phi xy(\tau)$ of outputs $y(t)$ and $x(t)$ by means of a correlator 6 it is possible to obtain a chromatogram or a continuous result of the analysis.

Figure 8A:
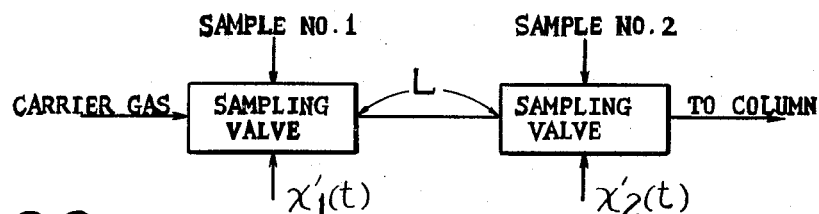
Figure 8B:
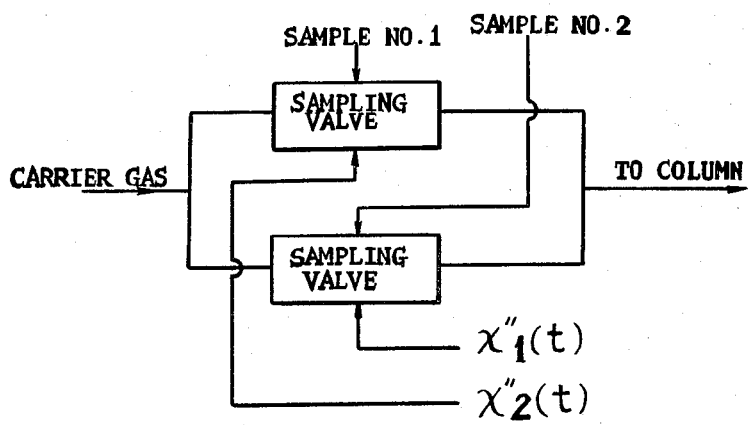

Further, as samples are injected in accordance with the pulsed pseudo-random binary signal it is possible to use conventional sampling valves and to connect in series or parallel with a number of sampling valves as shown in FIGS. 8a and 8b when analyzing a number of samples. In the case of FIG. 8a, the spacing L between valves may be suitably selected by taking into consideration the flow speed of the carrier gas and the pulse width. Whereas, in the case of FIG. 8b, utilization of the above described dephased pulse $p(t - k\delta)$ results in the simplification of the sample injector as well as the assurance of the definite quantity of the sample and decrease in the variation of the carrier gas, thus increasing the accuracy of the analysis.

What is claimed is:

1. A continuous analyzing device comprising:
   a. a signal generator means for producing a pulse signal having a predetermined repetition period ($\Delta$) and a predetermined width ($\delta$); a plurality of pseudo-random binary signals each having a predetermined minimum pulse width ($\Delta$), a predetermined repetition period ($N\Delta$) and a predetermined phase difference from each other for a correlation function; and a plurality of pulsed pseudo-random binary signals, each having a predetermined pulse width ($\delta$) which is smaller than said pulse width ($\Delta$) of said pseudo-random binary signals, each of said pulsed pseudo-random binary signals being obtained by a conjunction of a predetermined succession of one of said pseudo-random binary signals and said pulse signal, for sample injection;

b. a sample injector connected into conduits carrying a carrier gas at a constant flow rate, said sample injector having at least one sampling valve for continuously injecting gas samples into said carrier gas;

c. a valve drive means operable for driving said sampling valves to inject said samples into said carrier gas in accordance with said pulsed pseudo-random binary signals;

d. a column means having an input end to receive said carrier gas and said samples for separating various components of said samples included in said carrier gas;

e. a detector means connected to the output end of said column means for obtaining a composite signal corresponding to said various components of said samples, which are injected in accordance with said pulsed pseudo-random binary signals; and f. a correlator means coupled to said signal generator means and said detector means for computing a cross-correlation function between said pseudo-random binary signals and said composite signal detected by said detector means, said composite signal being obtained in accordance with said pulsed pseudo-random binary signals.

2. The analyzing device according to claim 1 wherein said sampling valves are connected in series.

3. The analyzing devices according to claim 1 wherein said sampling valves are connected in parallel.

* * * * *